(12) United States Patent
Smith

(10) Patent No.: US 6,428,255 B1
(45) Date of Patent: Aug. 6, 2002

(54) BLIND RIVET

(75) Inventor: Daniel R. Smith, Birmingham (GB)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/718,789

(22) Filed: Nov. 22, 2000

(30) Foreign Application Priority Data

Dec. 7, 1999 (GB) ............................................ 9928857

(51) Int. Cl.⁷ ................................................ F16B 13/04
(52) U.S. Cl. ............................. 411/38; 411/43; 411/70
(58) Field of Search ............................. 411/34–38, 43, 411/69, 70

(56) References Cited

U.S. PATENT DOCUMENTS

| | | | | |
|---|---|---|---|---|
| 4,988,247 A | * | 1/1991 | Summerlin | 411/43 X |
| 5,496,140 A | * | 3/1996 | Gossmann et al. | 411/43 |
| 5,645,383 A | * | 7/1997 | Williams | 411/43 |
| 6,254,324 B1 | * | 7/2001 | Smith et al. | 411/38 X |

FOREIGN PATENT DOCUMENTS

DE 3612501 * 10/1987 ................... 411/43

* cited by examiner

Primary Examiner—Neill Wilson
(74) Attorney, Agent, or Firm—Edward D. Murphy

(57) ABSTRACT

A blind rivet having a mandrel with a predetermined breakable stem (4) disposed within a body with a bored (18) shank (14). A radial flange (16) is formed on one end of the shank and the other end (20) of the shank is engaged with the enlarged head (2) up the stem the diameter of which is substantially equal to that of the shank. The mandrel below the enlarged head has a plurality of indentations (8) formed on the stem to define a square of reduced cross-sectional area. The shank has an enlarged internal cross-sectional area (22) to substantially engage the indentations of the stem below and adjacent to the enlarged head of the stem.

20 Claims, 1 Drawing Sheet

BLIND RIVET

BACKGROUND OF THE INVENTION

Figure 1:
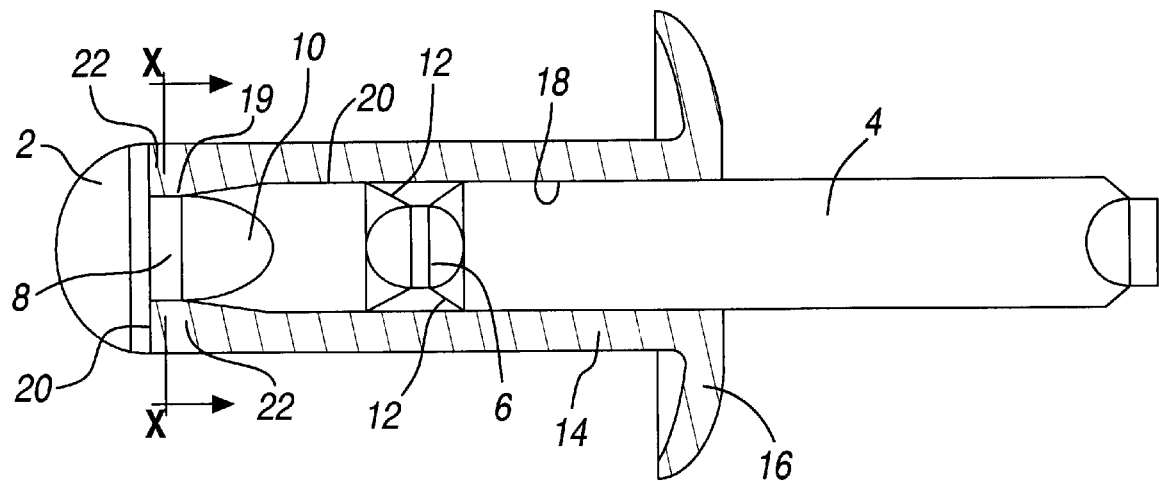

This invention relates to a blind rivet.

Blind rivets are well-known and generally comprise a mandrel having a pulling stem with a radially enlarged head attached at one end and a tubular shell having a generally cylindrical shaped shank with a radial flange formed at one end of the end of the shank for engaging a face of the workpiece. An axial bore is formed through the length of the shank and the flange. Part of the pulling stem is located within the bore, the enlarged head abutting against the end of the shank remote from the flange. The rest of the pulling stem extends beyond the flange away from the tubular shell. A portion of the shell is of reduced section or a breakneck which is formed on part of the stem which is located within the shank. When the blind rivet is set, the flange is held stationary whilst the exposed part of the pulling stem is pulled axially away from the flange so that the enlarged head is forced to pass through the bore. Because the diameter of the enlarged head is substantially larger than the bore, it causes the shank to deform to form an annular bulge or fold which projects radially outwardly from the shank. Thus the radially outward bulge forms the blind head and engages the opposite side of the workpiece to that of the flange. Once the pulling force on the stem exceeds a predetermined amount, the breakneck breaks leaving the rivet set. The rest of the stem can then be removed and discarded.

One type of blind rivet comprises a tubular shank of uniform outer diameter and a mandrel which comprises four indentations located immediately below the head of the mandrel which form a cruciform in shape when viewed in cross-section. It is into these indentations that the body material of the shell is displaced when the mandrel is assembled and consolidated to the tubular shank which results in the rivet having a shank greater thickness around these indentations and of higher material hardness. The outer diameter of the shank remains uniform even at the section which surrounds the indentations.

However, due to variations in the manufacture of the tubular shank and in the subsequent assembly and consolidation to give the thickened end, small gaps between the inner wall of the shank and the indentations can remain. Also, the mandrel may be eccentrically located within the shank and thus the material of one side of a rivet body may not fully fill the indentations beneath the mandrel head.

As described above, during the setting of blind rivets the mandrel is subjected to a tensile loading. Just prior to when the mandrel breaks at the breakneck, the tensile loading will be at its maximum. As the breakneck breaks, the tension or strain energy within the part of the mandrel retained within the body of the rivet is released. This can cause the mandrel head to dislodge from the position where the mandrel stem breaks and result in a gap between the indentations in the mandrel and the thickened portion of the rivet body through which water can pass.

SUMMARY OF THE PRESENT INVENTION

Accordingly, there is provided a blind rivet comprising:
a body having a generally cylindrical shank, a radial flange formed at one end of the shank and a bore which extends axially through the flange and through at least part of the length of the shank; and
a mandrel comprising a mandrel head located adjacent end of a bore remote from the flange, a stem attached to the mandrel head which passes through the length of the bore and extends beyond the flange and which comprises a breakneck formed on the stem, wherein the mandrel comprises a plurality of indentations formed around the stem adjacent to the mandrel head and which taper partway along the stem away from the mandrel head characterised in that the shape of the cross-section of the stem at the point where the indentations are located is substantially square.

By designing the blind rivet in this manner, it prevents or at least reduces the effect of the recoil of the mandrel head portion on setting and prevents, or at least reduces, the separation of the mandrel and the thickened portion of the shank and thus prevents or reduces the amount of ingress of water or moisture through the rivet body. Furthermore, such a design can improve the mandrel retention in the rivet body prior to setting and can prevent the portion of the mandrel retained within the body of the rivet after setting from moving thus resisting the potential for moisture ingress.

The shank can have a thickened end at the region of indentations so that the stem is prevented from movement by virtue of the reverse taper portions thus further improving the mandrel retention in the rivet body.

Further tapers can be provided just prior to the breakneck to prevent the mandrel digging into the walls of the bore as the mandrel passes through the bore when the rivet is being set. As the mandrel does not dig into the body of a rivet, the setting of a rivet is not hindered or prevented.

Ideally the outer diameter of the shank has a uniform diameter. Preferably the material of the shank completely fills the indentations. This results in the thickness of the wall of the shank around the stem of the point where the indentations are formed being much thicker and can also be of higher hardness.

BRIEF DESCRIPTION OF THE ACCOMPANYING DRAWINGS

Figure 2:
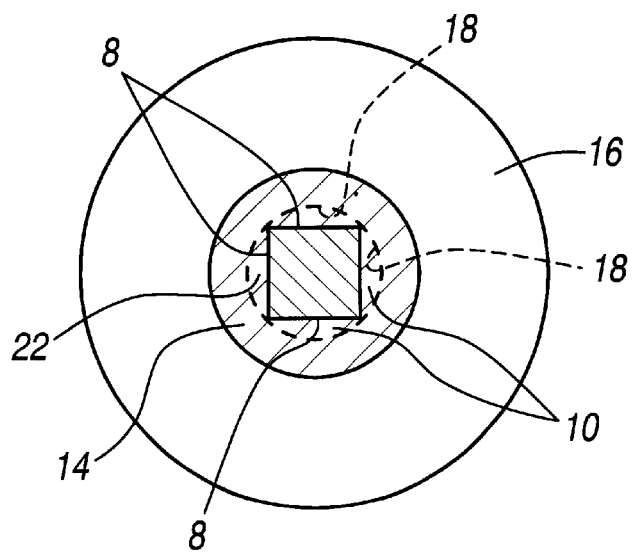

An embodiment of the invention will now be described with reference to the accompanying figures of which:

FIG. 1 shows a longitudinal cross-section of the blind rivet according to the present invention; and FIG. 2 shows the details of the stem of a mandrel indicated in FIG. 1 by the line X;

DETAILED DESCRIPTION OF THE PREFERRED EMBODIMENTS

Referring to FIG. 1, the mandrel comprises a mandrel head (2) attached to one end of the stem (4). The stem comprises a breakneck (6) located towards the mandrel head (2). The diameter of the stem (4) located on the side of the breakneck (6) remote from the mandrel head (4) has a uniform diameter. Four indentations (8) are formed in the stem immediately beneath the mandrel head (2). The cross-section of the stem (4) at the point where the indentations are formed is substantially square as best shown in FIG. 2. From each of the four indentations (8) a flat surface (10) tapers to meet the outer diameter of stem (4) as best shown in FIG. 1. A further taper (12) is formed further down the stem (4) which extends from the breakneck (6) towards the mandrel head (2). The rivet body comprises a tubular shank (14) having a flange (16) formed at one end which extends radially outwards. A bore (18) passes through the flange (16) and through the full length of the shank (14) and emerges at the other side of the shank (14). The mandrel stem (4) is located within the bore (18) so that the mandrel head (2) abuts against the end (20) of the shank (14) remote from the flange (16) as best seen in FIG. 1. Material (22), from which the shank (14) is formed, is located within the indentations (8) such that the thickness of the wall of the shank (14) which surrounds the indentations (8) is substantially thicker than the rest of the thickness of the wall of the shank (14) and substantially harder than the rest of the shank. The outer diameter of the shank (4) remains substantially constant along its full length, the diameter being approximately the same as that of the head (2).

The rivet is set by inserting the mandrel head (2) and shank (14) into a bore formed through a workpiece to be fastened so that the flange (16) abuts against one surface (the visible surface) of the workpiece. The mandrel head (2) and the end (20) of the shank protruding from the other surface (the blind surface). A rivet setting tool, which are well known in the art, is used to set the rivet.

As is best shown in FIG. 2, the blind rivet has a body having a generally cylindrical shank 14 with a constant outer radius and a radial flange 16 formed at one end of the shank 14. The body defines a bore 18 having a first axial bore 19 with a first cross sectional area and a second coaxial bore 21 having a second larger cross sectional area.

The mandrel stem 4 is coupled to the mandrel head 2 located adjacent the end of the bore 18 remote from the flange 16. The stem 4 which is attached to the mandrel head 2, passes through the first and second axial bores 19 and 21 and defines the first portion adjacent the head 2 having a substantially square cross section (See area formed by indents 8) which is adjacent the first axial bore 19. Disposed between the head 2 and the flange 16 is a breakneck 6. The breakneck is formed by a second portion having substantially flat size and a cross section smaller than the first portion of the mandrel stem 4. This can be seen in FIG. 2. The first axial bore 19 has a cross sectional area substantially the same as the cross sectional area of the first portion of the mandrel stem 4. It should be noted that the shank 14 although having a constant outer radius, has a material thickness greater at the first axial bore 19 than the thickness of the shank at the second axial bore 21.

Defined between the square first portion of the mandrel and the cylindrical second portion of the mandrel are generally flat surface tapers 10, which transition from the square lower cross sectional area portions of the mandrel to the circular cross sectional areas of the stem 10. As can best be seen in FIG. 1, the material thickness of the shank decreases as the flat surface taper 10 transitions the mandrel from a square to a circular cross section. Similarly, the breakneck 6 has tapers 12 formed on mandrel stem 4 to transition from the square cross section to the circular cross section of the mandrel stem 4.

A part of the rivet setting tool abuts against the flange (16) to keep it stationary. The jaws of the tool grip the exposed part of the stem (4), pulling the stem (4) away from the flange causes the head (2) to transfer the pulling load to the tubular shank putting it under a compressive loading which causes the tubular shank to form an annular blind side bulge. As the diameter of the bore (18) is less than that of the head (2), the shank (14) forms an annular bulge which abuts against the blind surface to hold the rivet in place. As the head (2) further compresses the shank (14) the tensile stress within the stem increases until it reaches a predetermined amount at which point the breakneck (6) breaks. The majority of the stem (4) becomes detached from the body which can then be discarded, the head (2) and a small portion of the stem continue to remain fixed within the deformed shank (14) by virtue of the thickened end of the shank and the taper portions (10).

The taper (12) on the stem (4) prevents the stem (4) digging into the wall of the bore (18) ensuring free travel of the stem (4) through the bore (18) and thus avoiding hindrance of the stem in its correct function of setting the rivet.

In general, the above-identified embodiments are not to be construed as limiting the breadth of the present invention. It is understood that other modifications or other alternative constructions will be apparent which are within the scope of the invention as defined in the appended claims.

What is claimed is:

1. A blind rivet comprising:
   a. a body having a generally cylindrical shank, a radial flange formed at one end of the shank and a bore which extends axially through the flange and through at least part of the length of a shank; and
   b. a mandrel comprising a mandrel head located adjacent an end of the bore remote from the flange, the diameter of the head being larger than the diameter of the bore, a stem attached to the mandrel head which passes through the length of the bore and extends beyond the flange and which comprises a breakneck located on the stem, wherein the mandrel comprises a plurality of indentations formed around the stem adjacent to the mandrel head which taper partway along the stem within the shank in a direction away from the head, characterized in that the shape of the cross-section of the stem at the point where the indentations are formed is substantially square.

2. A blind rivet according to claim 1 whereby the shank has a thickened end at the region of indentations to prevent the stem prevented from movement by virtue of the reverse taper portions.

3. A blind rivet according to claim 2 wherein the mandrel comprises a further taper which leads from the breakneck and which prevents the mandrel from digging into the walls of the bore as the mandrel passes through the bore when the rivet is being set.

4. A blind rivet according to claim 3 wherein the shank of the body of the rivet comprises a substantially uniform outer diameter.

5. A blind rivet according to claim 4 wherein the material of the body of the rivet substantially completely fills the indentations.

6. A blind rivet comprising:
   a body having a cylindrical shank having a generally constant outer radius, and a radial flange formed at one end of the shank,
   said body defining a first axial bore having a first cross sectional area and a second coaxial bore having a second cross sectional area;
   a mandrel comprising:
   a mandrel head located adjacent an end of the bore remote from the flange, a stem attached to said mandrel head which passes through said first and second axial bores,
   said mandrel defining a first portion adjacent said head having a substantially square cross-section.

7. The blind rivet according to claim 6 further comprising a breakneck.

8. The blind rivet according to claim 7 wherein the breakneck has a substantially square cross section.

9. The blind rivet according to claim 6 wherein said first axial bore is adjacent said first portion of the mandrel.

10. The blind rivet according to claim 6 wherein said first axial bore has a square cross section.

11. The blind rivet according to claim 6 wherein said first cross sectional area is equal to the cross sectional area defined by the first portion of the mandrel.

12. The blind rivet according to claim 6 wherein said mandrel comprises a second portion having substantially flat sides.

13. The blind rivet according to claim 12 wherein said second portion is adjacent to the said first portion.

14. The blind rivet according to claim 12 wherein said second portion is adjacent to said breakneck.

15. A blind rivet comprising:
- a body having a cylindrical shank having a generally constant outer radius, and a radial flange formed at one end of the shank, said body defining a first axial bore having a first cross sectional bore area and a second coaxial bore having a second cross sectional bore area, wherein said first cross sectional bore area is less than said second cross sectional bore area;
- a mandrel disposed within said first and second axial bores, said mandrel defining a mandrel head which is located adjacent to said first axial bore and further defining a first portion having a third cross sectional area and a second portion having a fourth cross sectional area, wherein said fourth cross sectional area is larger than said third cross sectional area;
- wherein said first cross sectional bore area is substantially equal to said third cross sectional area.

16. The blind rivet according to claim 15 wherein said mandrel further comprises a breakneck.

17. The blind rivet according to claim 15 wherein said first axial bore is square.

18. The blind rivet according to claim 15 wherein said mandrel first portion is square.

19. The blind rivet according to claim 16 wherein said brakeneck is square.

20. The blind rivet according to claim 19 wherein said mandrel comprises a third portion having substantially flat side disposed between said first and second portions.

* * * * *